UNITED STATES PATENT OFFICE.

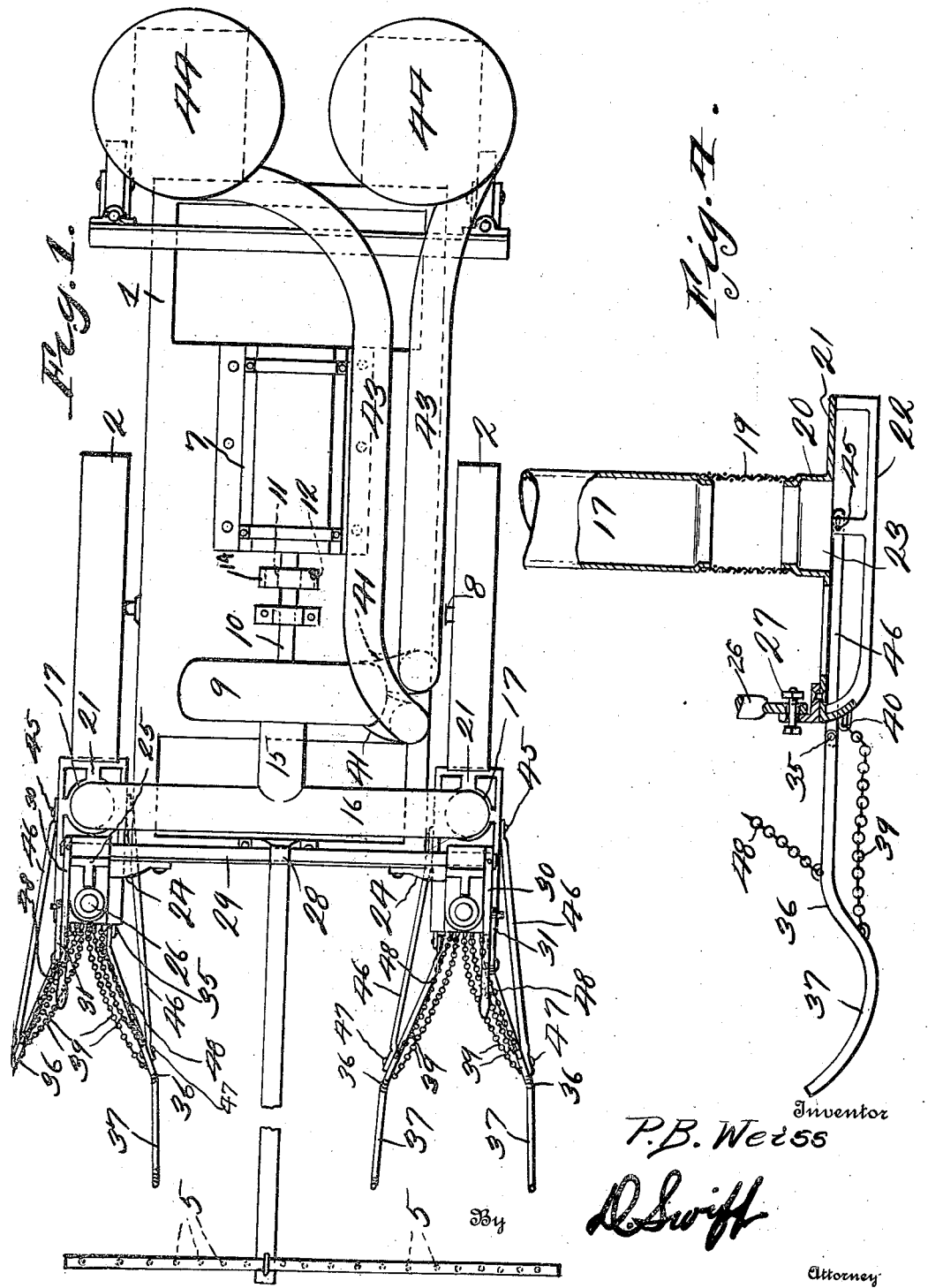

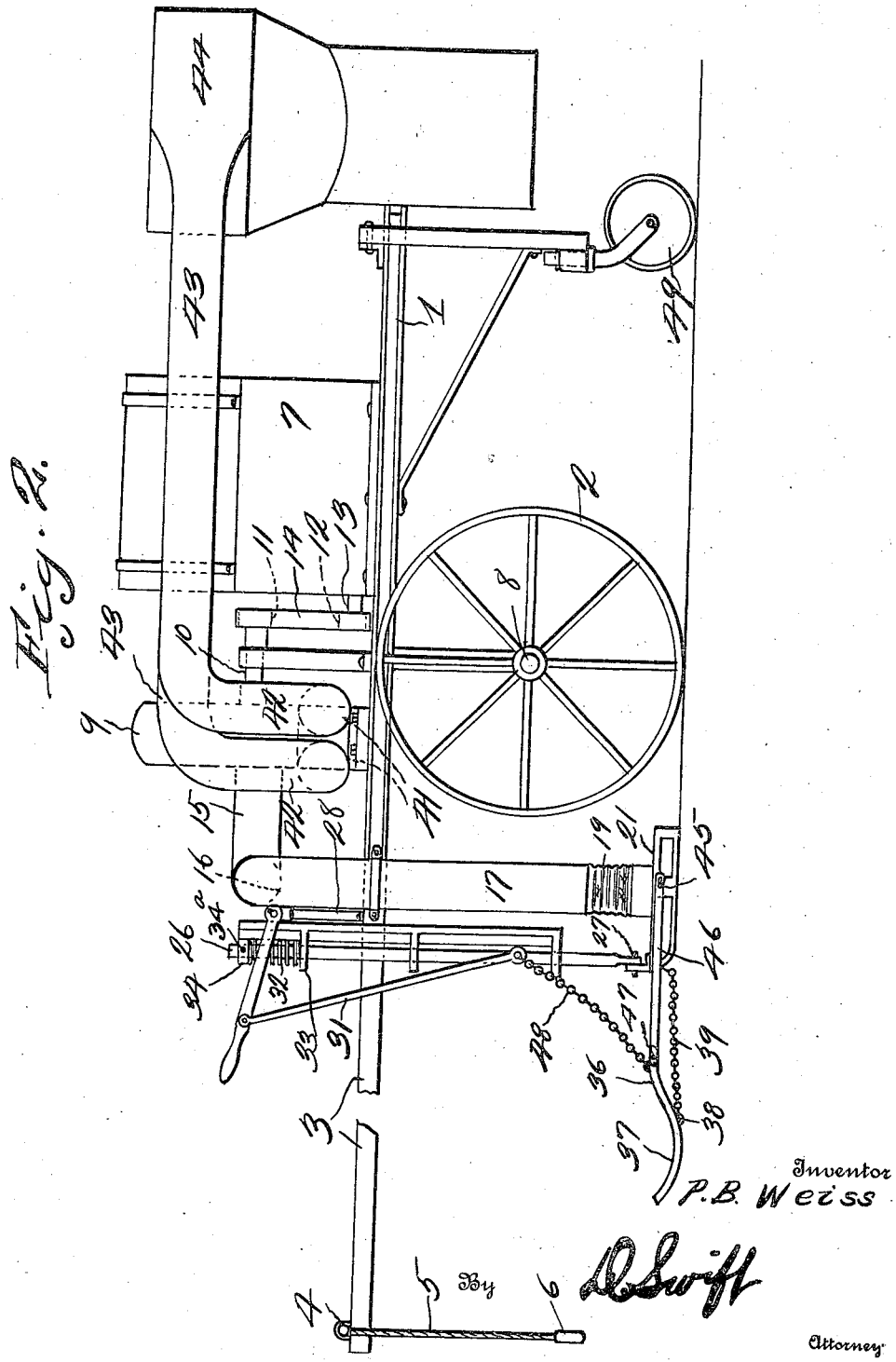

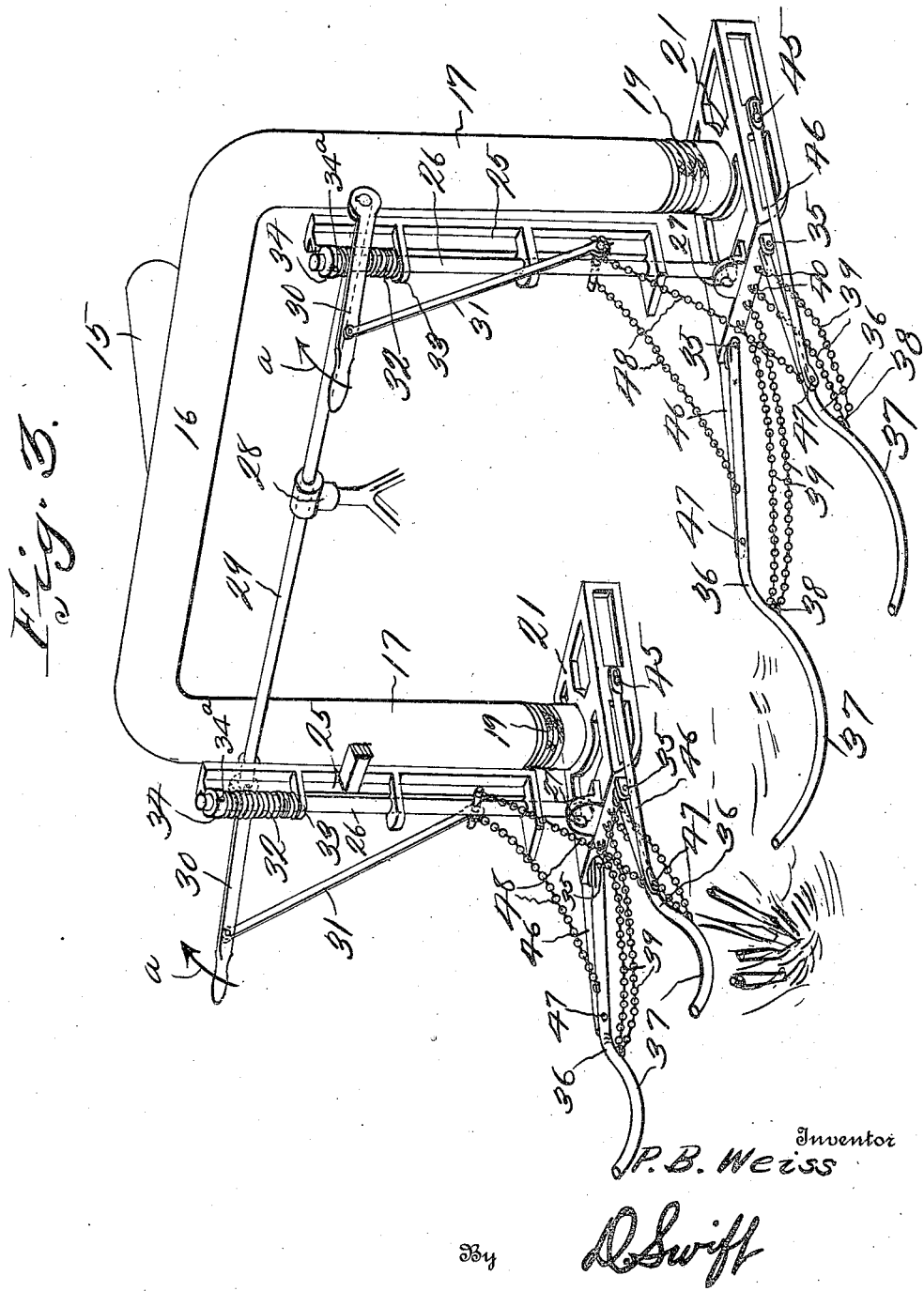

PAULINE B. WEISS, OF NEW YORK, N. Y.

BOLL-WEEVIL DESTROYER.

1,426,234. Specification of Letters Patent. Patented Aug. 15, 1922.

Application filed August 29, 1921. Serial No. 496,397.

*To all whom it may concern:*

Be it known that I, PAULINE B. WEISS, a citizen of the United States, residing at New York, in the county of New York, State of New York, have invented a new and useful Boll-Weevil Destroyer; and I do hereby declare the following to be a full, clear, and exact description of the invention, such as will enable others skilled in the art to which it appertains to make and use the same.

The invention relates to boll weevil destroyers and has for its object to provide a device of this character comprising a wheeled vehicle preferably of a straddle row type, and provided with means whereby cotton plants will be vibrated, the weevils and squares dislodged therefrom and allowed to fall on the ground. Also to provide means located rearwardly of the plant vibrating means whereby the weevils and squares will be scraped together by ground engaging members and guided to a position in alignment with suction members located adjacent the ground.

A further object is to locate the intake ends of the suction members and the gathering devices in alignment with the wheels of the vehicle, thereby so positioning the wheels in relation to the other parts of the machine that weevils which may not be raised by the suction members will be crushed by the wheels.

A further object is to provide weevil gathering and centering members comprising ground engaging devices which have flexible connections to the intake pipes and are substantially universally mounted on vertically adjustable and movable supporting bars, said ground engaging members being provided with forwardly, extending and diverging ground engaging fingers which fingers are pivoted to the forward end of the ground engaging member carried by the suction pipe, and form means for engaging the surface of the ground and causing the weevils and squares on the surface to be forced inwardly where they will be engaged and further moved inwardly by rearwardly extending converging ground engaging chains, the outer ends of which are connected to the ground engaging pivoted members and the rear ends connected to the ground engaging members carried by the suction pipe.

A further object is to provide means whereby the ground engaging members and their forwardly extending diverging gathering fingers will conform to the contour of the ground. Also to provide means whereby both ground engaging members and the fingers pivoted thereto may be simultaneously raised out of engagement with the ground.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the boll weevil machine.

Figure 2 is a side elevation of the machine.

Figure 3 is a perspective view of the gathering devices, their controlling mechanism and the suction ends of the suction pipe.

Figure 4 is a detail sectional view through one of the ground engaging members and the intake end of the suction pipe connected thereto showing the ground engaging member flexibly connected to the suction pipe.

Referring to the drawings, the numeral 1 designates a substantially rectangular shaped frame, which frame is supported in a horizontal plane and supported on wheels 2, one of which wheels, when the machine is straddling a cotton row is disposed on each side of the row and preferably centrally disposed in relation to the rows. The machine hereinafter set forth is of a straddle row type and so constructed that weevils and squares will be dislodged from plants and gathered from the ground on each side of the row of plants. Extending forwardly from the forward end of the frame 1 is a tongue 3, to which draft animals may be attached in any suitable manner. The forward end of the tongue 3 is provided with a transversely disposed bar 4, from which bar downwardly extending weighted ropes 5 are suspended, which ropes and their weights 6 engage the cotton plants, vibrate the same in such a manner that the squares in which the embryos are disposed will be dislodged and allowed to fall on the ground.

Disposed on the frame 1 is a conventional form of internal combustion engine 7, which engine is disposed slightly rearwardly of the supporting axis 8 and is so disposed that the machine as a whole is substantially counterbalanced on the wheels 2. Secured to the frame 1 preferably at a point slightly forwardly of the axle 8 is a centrifugal fan 9, which fan is provided with a rearwardly extending shaft 10 to the end of which is secured a pulley 11. The shaft 10 is rotatably mounted in a bearing 10$^a$ of a bracket 10$^b$. Extending around the pulley 11, and around a pulley 12 carried by the drive shaft 13 of the engine 7 is a belt 14, by means of which belt the shaft 10 is rotated and consequently the centrifugal fan operated. Extending forwardly from the centrifugal fan 9 is an intake pipe 15, which intake pipe merges into a transversely disposed suction pipe 16, the ends of which extend downwardly in vertical positions on each side of the frame 1 and are designated by the numeral 17. Pipe sections 17 are preferably vertically disposed and are in the same vertical longitudinal planes as the vehicle supporting wheels 2, the purpose of which will hereinafter appear. The lower ends of the sections 17 terminate in flexible connections 19, the lower ends of which flexible connections are secured to flanges 20, preferably annular flanges, which flanges are carried by ground engaging members 21, which are provided with runners 22, which slide over the ground. As the machine moves forwardly one of the ground engaging members 21 engages the ground on each side of the row of cotton substantially centrally between the rows. It will be seen that by providing the ground engaging members 21, the intake ends 23 will at all times be equally spaced from the ground, and properly spaced to obtain the proper air displacement at the intake ends 23 for securing the maximum lifting efficiency at the intake ends of the suction pipe. The members 21 may have their upper sides cutaway as shown at 21$^a$ for reducing the weight of said members and to provide openings through which the suction action adjacent the intake ends of the pipe may be observed, and the sides of the members may be provided with openings 21$^b$ which not only provide lightning means for the ground engaging members but provide openings through which the suction action may be observed.

Supported forwardly of the pipe sections 17 in vertical positions by means of frame carried brackets 24 are vertically disposed brackets 25, in bearings of which are vertically movable and guidable bars 26, the lower ends of which are loosely pivoted at 27 to the forward ends of the ground engaging members 21. The loose connections 27 are substantially unlimited transversely in the rocking of the ground engaging members 21, however the looseness is limited to a certain extent in the longitudinal rocking of the ground engaging members 21. This limitation of rocking movement longitudinally is not sufficient to prevent ground engaging members 21 from following the contour of the ground, however it is sufficiently limited whereby upon upward movement of the bars 26, said ground engaging members will be raised out of engagement with the ground, thereby allowing the machine to be transported from place to place when not in operation. Rockably mounted in a bearing of a bracket 28 carried by the forward end of the frame 1 is a rock shaft 29, to the outer ends of which are secured operating levers 30. Operating levers 30 are connected to the vertically movable shafts 26 adjacent their lower ends by means of connecting rods 31. It will be seen that when either of the operating levers 30 is moved in the direction of the arrows $a$, that both vertically movable shafts 26 will be simultaneously raised, thereby simultaneously raising the ground engaging member 21 out of engagement with the ground. When the ground engaging members 21 are lowered the shock is taken up by means of coiled springs 32, which surround the upper ends of the shafts 26 and are interposed between lugs 33 carried by the brackets 25 and movable collars 34 carried by the upper ends of the shafts 26. It will be seen that by loosening the set screws 34$^a$ and changing the position of the collars 34 that the tension of the coiled springs 32 may be varied for taking up the shock during the lowering operation of the ground engaging elements 21. Pivotally connected at 35 to the forward ends of the ground engaging members 21 are forwardly extending and diverging ground engaging fingers 36, the forward ends of which are bowed downwardly at 37, thereby forming members for engaging the ground adjacent the stalks of the plants and also forming diverging supporting members, to which members may be secured at 38 rearwardly and inwardly extending ground engaging chains 39, the rear ends of which are connected at 40 to the forward ends of the ground engaging members 21. It will be seen that during the forward movement of the machine, that after the weevils have been dislodged from the plant by the weighted ropes 5 and have fallen on the ground, that the ground between the rows will be thoroughly scraped by the adjacent bowed portions 37 of the pivoted ground engaging fingers 36 and by the converging chains 39 in such a manner that the squares which have been dislodged will be scraped from the surface of the ground to points substantially centrally of the ground engaging members 21. As the vehicle continues forwardly in its movement the weevils will pass under the intake ends 23 of the sections 17 of the suction pipe 16, and will be lifted through said pipe and carried through the centrifugal fan 9, which fan during its rapid rotation partly destroys the squares, thereby dislodging the embryos, and as the embryos and squares are discharged tangentially through the discharge pipes 41, they are projected with a great deal of force against the inner walls of the vertical portions 42 of the discharge pipes 41. The vertical portions 42 of the discharge pipes 41 merge into horizontally disposed and rearwardly extending pipe sections 43, which sections discharge tangentially into collecting containers 44, which may be of any suitable construction.

Loosely pivoted at 45 to the sides of the ground engaging members 21 are forwardly extending brace bars 46, the forward ends of which are pivoted at 47 to the outer sides of the ground engaging fingers 36. Braces 46 form means for bracing the fingers during their movement and hold the same from being bent outwardly incident to being dragged over the surface of the ground at an angle to the direction of travel of the machine. Connected to the shafts 26 are downwardly and forwardly extending chains 48, which chains have sufficient slack as not to interfere with the movement of the ground engaging fingers 36 independently in relation to the ground engaging members 21, however said chains 48 form means whereby upon an upward movement and raising of the ground engaging elements 21, said ground engaging fingers 36 will be raised clear of the ground, thereby allowing the vehicle to be easily moved from place to place without danger of the fingers 36 and ground engaging members 21 coming into engagement with obstructions.

It will be seen that the gathering members and suction ends of the intake pipes are in the same longitudinal planes vertically as the vehicle wheels, therefore, it will be seen that weevils which are not lifted through the pipes will be crushed by the supporting wheels 2, or by the rear supporting wheels 49 carried by the rear end of the frame 1.

From the above it will be seen that a boll weevil gathering device is provided which is simple in construction, and one so constructed that squares and weevils will be dislodged from cotton plants and then gathered from the surface of the ground on each side of the row of plants. It will also be seen that the machine is simple in construction, and positive in its operation.

The invention having been set forth what is claimed as new and useful is:—

1. A boll weevil collecting machine comprising a wheel supported frame, plant agitating means carried by said frame, a suction pipe disposed rearwardly of the agitating means, said suction pipe having its intake end disposed adjacent the surface of the ground, ground engaging means for maintaining the suction pipe at a uniform distance from the ground as the machine advances and means located forwardly of the suction pipe whereby dislodged weevils and squares will be guided to a position under the intake end of the suction pipe.

2. A boll weevil collecting machine comprising a wheel supported frame, plant agitating means carried by said frame, suction pipes carried by the frame and having their intake ends disposed adjacent the surface of the ground, ground engaging elements carried by the suction pipes for maintaining the ends thereof at a uniform distance from the ground as the machine advances, means located forwardly of the suction pipes for moving the weevils to a position under the suction pipes as the machine moves forwardly and means whereby said intake ends of the suction pipes may be raised or lowered.

3. The combination with a suction pipe of a boll weevil collecting machine, of a ground engaging member flexibly connected to said suction pipe and forming means for normally maintaining the intake end of the suction pipe at a uniform distance from the ground as the machine moves.

4. A boll weevil machine comprising a frame, a supporting wheel located on each side of the frame, suction pipes disposed one forwardly of each wheel and having their intake ends disposed adjacent the ground, said suction pipes being positioned in substantially the same longitudinally vertical planes as the wheels.

5. A boll weevil machine comprising a frame, wheels for supporting said frame, a suction pipe disposed forwardly of one of said wheels and in the same longitudinal vertical plane as the wheel.

6. The combination with intake ends of downwardly extending suction pipes of a boll weevil machine of the straddle row type, of ground engaging elements connected to the lower ends of said suction pipes by means of flexible pipe sections, vertically movable standards disposed forwardly of the pipe sections, the ground engaging elements being pivotally connected to said standards, means for moving said standards vertically, gathering fingers pivoted to the ground engaging elements and extending forwardly and having independent movement in relation to the ground engaging elements, and flexible drag members carried by said fingers and forming means whereby weevils will be guided to a central point in relation to the ground engaging elements.

7. The combination with the intake end of a suction pipe of a boll weevil machine, of a ground engaging member carried by said pipe, a flexible pipe section interposed between the ground engaging element and the pipe, a vertically movable standard pivoted to the ground engaging element adjacent its forward end, means whereby said standard may be raised and lowered, ground engaging fingers pivoted to the forward end of the ground engaging element, said fingers having independent movement in relation to the ground engaging element between predetermined limits and means whereby when the vertically movable standard is moved upwardly said ground engaging element and ground engaging fingers will be simultaneously raised.

8. The combination with the intake end of a suction pipe of a boll weevil machine, said intake end being disposed adjacent the ground, of means for maintaining the intake end of the suction pipe at uniform distance from the ground, said means comprising a ground engaging member having a flexible pipe connection with the lower end of the suction pipe.

9. The combination with a suction pipe of a boll weevil gathering machine having its intake end of its suction pipe disposed adjacent the surface of the ground, of means for gathering and converging the weevils to a point below the intake end of the suction pipe, said means comprising forwardly extending pivoted ground engaging member extending forwardly of the intake end of the suction pipe and rearwardly extending and converging linked drag chains carried by said ground engaging fingers.

10. The combination with the intake end of a suction pipe of a boll weevil machine, said intake end being disposed adjacent the surface of the ground, of means extending forwardly of said intake end for gathering weevils to a point where they will pass under the intake end as the machine advances, said means comprising pivoted forwardly extending diverging ground engaging fingers and forwardly and outwardly extending pliable members having their rear ends anchored substantially in alignment with the intake end of the suction pipe and their forward ends anchored to the ground engaging fingers.

11. A boll weevil gathering device, said device comprising suction pipes, pivoted forwardly extending members and pliable members formed from chains carried by said pivoted forwardly extending members and adapted to scrape the surface of the ground and gather weevils to a point under the suction pipe.

In testimony whereof I have signed my name to this specification in the presence of two subscribing witnesses.

PAULINE B. WEISS.

Witnesses:
 FRANK OWINGS,
 PHILIP A. H. TERRELL.